US012679105B2

(12) United States Patent
Sato

(10) Patent No.: US 12,679,105 B2
(45) Date of Patent: Jul. 14, 2026

(54) LIQUID PROCESSING DEVICE, CONTROL DEVICE, AND METHOD

(71) Applicant: RISO Technologies Corporation, Tokyo (JP)

(72) Inventor: Tetsuya Sato, Yokohama Kanagawa (JP)

(73) Assignee: RISO Technologies Corporation, Tokyo (JP)

( * ) Notice: Subject to any disclaimer, the term of this patent is extended or adjusted under 35 U.S.C. 154(b) by 129 days.

(21) Appl. No.: 18/671,675

(22) Filed: May 22, 2024

(65) Prior Publication Data

US 2025/0033372 A1 Jan. 30, 2025

(30) Foreign Application Priority Data

Jul. 26, 2023 (JP) ................................ 2023-121893

(51) Int. Cl.
*B41J 2/18* (2006.01)
*B41J 2/175* (2006.01)
*B41J 29/46* (2006.01)

(52) U.S. Cl.
CPC ............ *B41J 2/18* (2013.01); *B41J 2/17596* (2013.01); *B41J 29/46* (2013.01)

(58) Field of Classification Search
CPC . B41J 2/18; B41J 2/17596; B41J 29/46; B41J 2/175
See application file for complete search history.

(56) References Cited

U.S. PATENT DOCUMENTS

2012/0024395 A1* 2/2012 Furukawa ............... B41J 29/38 222/23
2019/0092034 A1 3/2019 Goto
2019/0092035 A1 3/2019 Hara

FOREIGN PATENT DOCUMENTS

JP H11188864 A 7/1999
WO 2017183363 A1 10/2017

OTHER PUBLICATIONS

Extended European Search Report dated Nov. 15, 2024, mailed in counterpart European Application No. 24183021.5, 7 pages.

* cited by examiner

*Primary Examiner* — Lisa Solomon
(74) *Attorney, Agent, or Firm* — Kim & Stewart LLP

(57) ABSTRACT

According to one embodiment, a liquid processing device includes a liquid flow path connected to a liquid ejecting head. A control unit is also provided. The control unit is configured to begin an operation to cause liquid to flow in the liquid flow path to the liquid ejecting head, receive a pressure value for liquid in the liquid flow path, and stop the operation when the pressure value is outside a normal range. Such a device can avoid damage resulting from malfunctions and the like.

16 Claims, 5 Drawing Sheets

LIQUID PROCESSING DEVICE, CONTROL DEVICE, AND METHOD

CROSS-REFERENCE TO RELATED APPLICATION

This application is based upon and claims the benefit of priority from Japanese Patent Application No. 2023-121893, filed Jul. 26, 2023, the entire contents of which are incorporated herein by reference.

FIELD

Embodiments described herein relate generally to a liquid processing device, a control device for a liquid processing device, and a method for a liquid processing device.

BACKGROUND

There is a liquid ejecting device that includes a liquid ejecting head that ejects a liquid. There is a liquid processing device that circulates or recirculates the liquid along a circulation path including a liquid ejecting head. The liquid process device can be a referred to as a liquid circulating device or the like. In a liquid ejecting device, a pressure adjustment is required to maintain the meniscus at a nozzle through which the liquid is ejected. The pressure adjustment requires detecting the pressure of the liquid on the circulation path.

When a malfunction in the pressure control occurs in the liquid processing device, this may prevent the appropriate ejection of the liquid from the liquid ejecting head for printing or the like. In such a case, an image defect can occur and printing efficiency decreases.

DETAILED DESCRIPTION

Embodiments relate to a liquid processing device, a control device, and a method having or providing improved printing efficiency.

According to one embodiment, a liquid processing device includes a liquid flow path connected to a liquid ejecting head. A control unit is also provided. The control unit is configured to begin an operation to cause liquid to flow in the liquid flow path to the liquid ejecting head, receive a pressure value for liquid in the liquid flow path, and stop the operation when the pressure value is outside a normal range. Such a device can avoid damage resulting from malfunctions and the like.

In another embodiment, a liquid processing device includes a flow path through which liquid flows. The flow path connects to a liquid ejecting head configured to eject the liquid. A control unit is provided and configured to stop an operation of causing the liquid to flow when a pressure of the flow path is outside a normal range.

A control device according to still another embodiment includes a control unit configured to stop an operation of causing liquid to flow when a pressure of a flow path through which the liquid flows is outside a normal range, the flow path communicating with a liquid ejecting head configured to eject the liquid.

A method according to yet another embodiment includes stopping an operation of causing liquid to flow when a pressure value of a flow path through which the liquid flows is not in a normal range in a liquid processing device including the flow path, the flow path communicating with a liquid ejecting head configured to eject the liquid.

First Embodiment

Hereinafter, an ink jet recording apparatus 1 (also referred to as a printing device) according to a first embodiment and a liquid ejecting device 10 (also referred to as a liquid circulating device or liquid processing device) will be described with reference to FIGS. 1 to 5. In each of the accompanying drawings, aspects may be illustrated in an enlarged or contracted manner. In some drawings, aspects may be omitted from the illustration for convenience and/or clarity of description.

Figure 1:
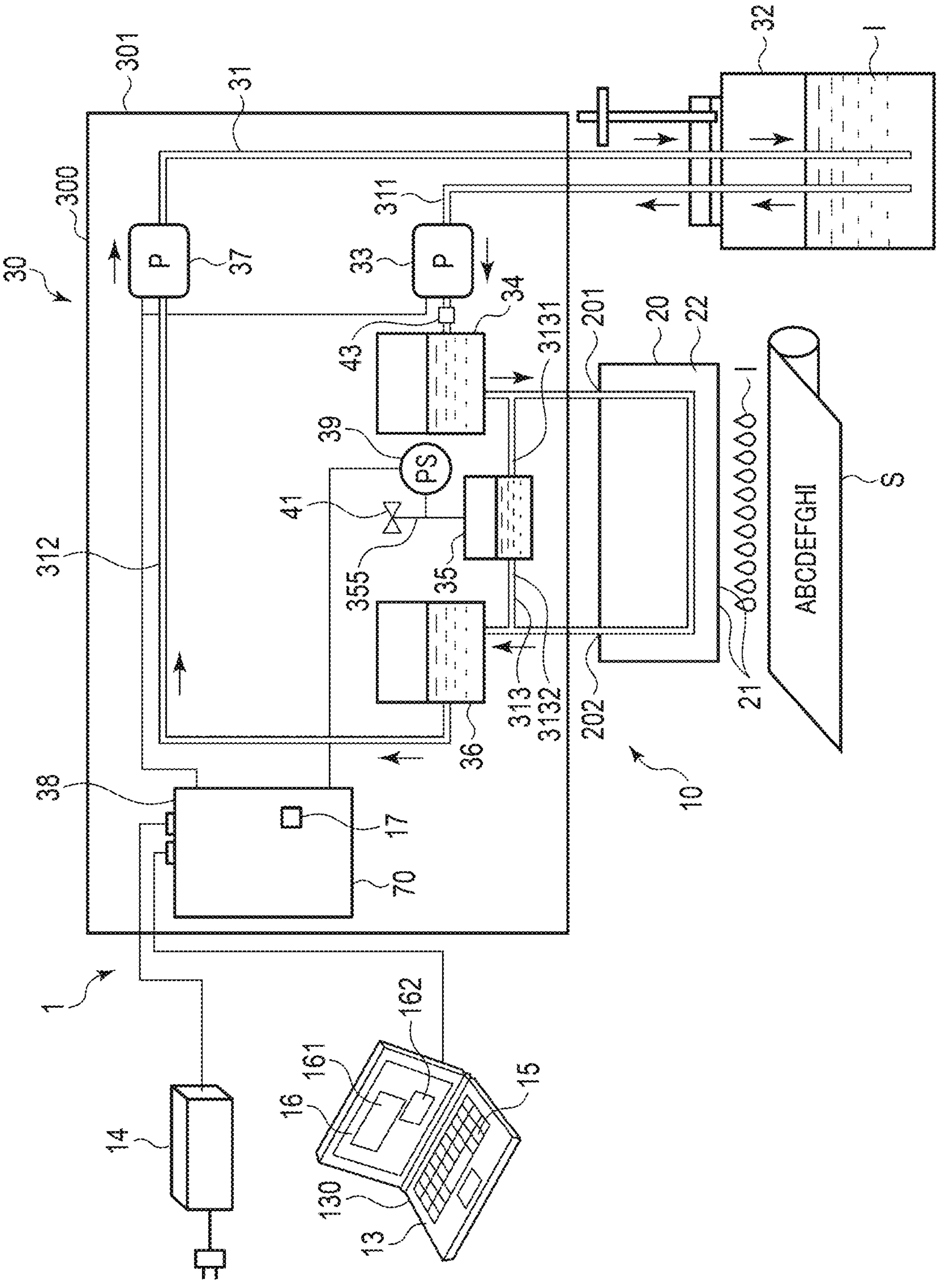
FIG. 1 depicts an ink jet recording apparatus according to a first embodiment.
Figure 2:
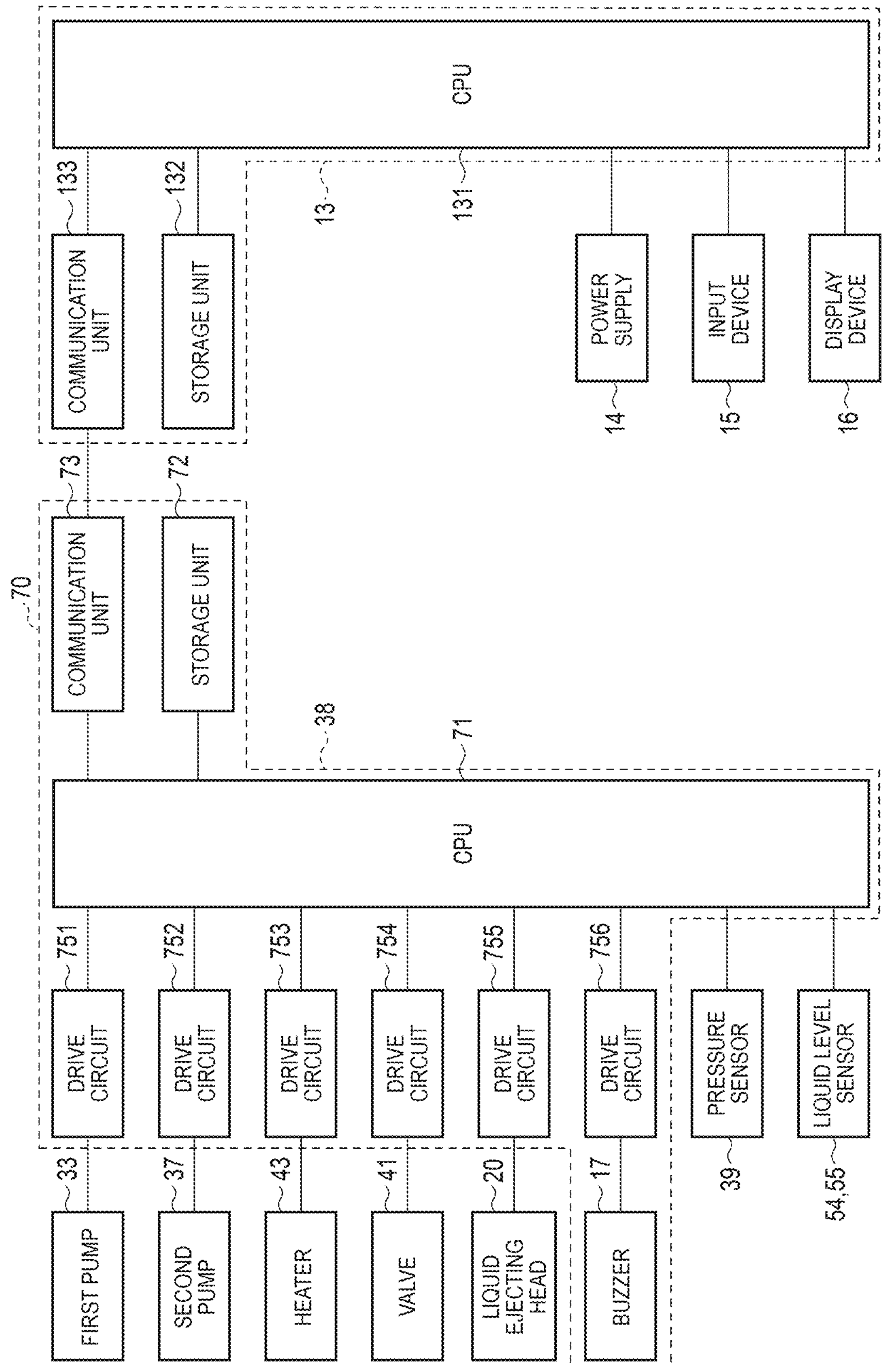
FIG. 2 depicts aspects of a control system of an ink jet recording apparatus.
Figure 3:
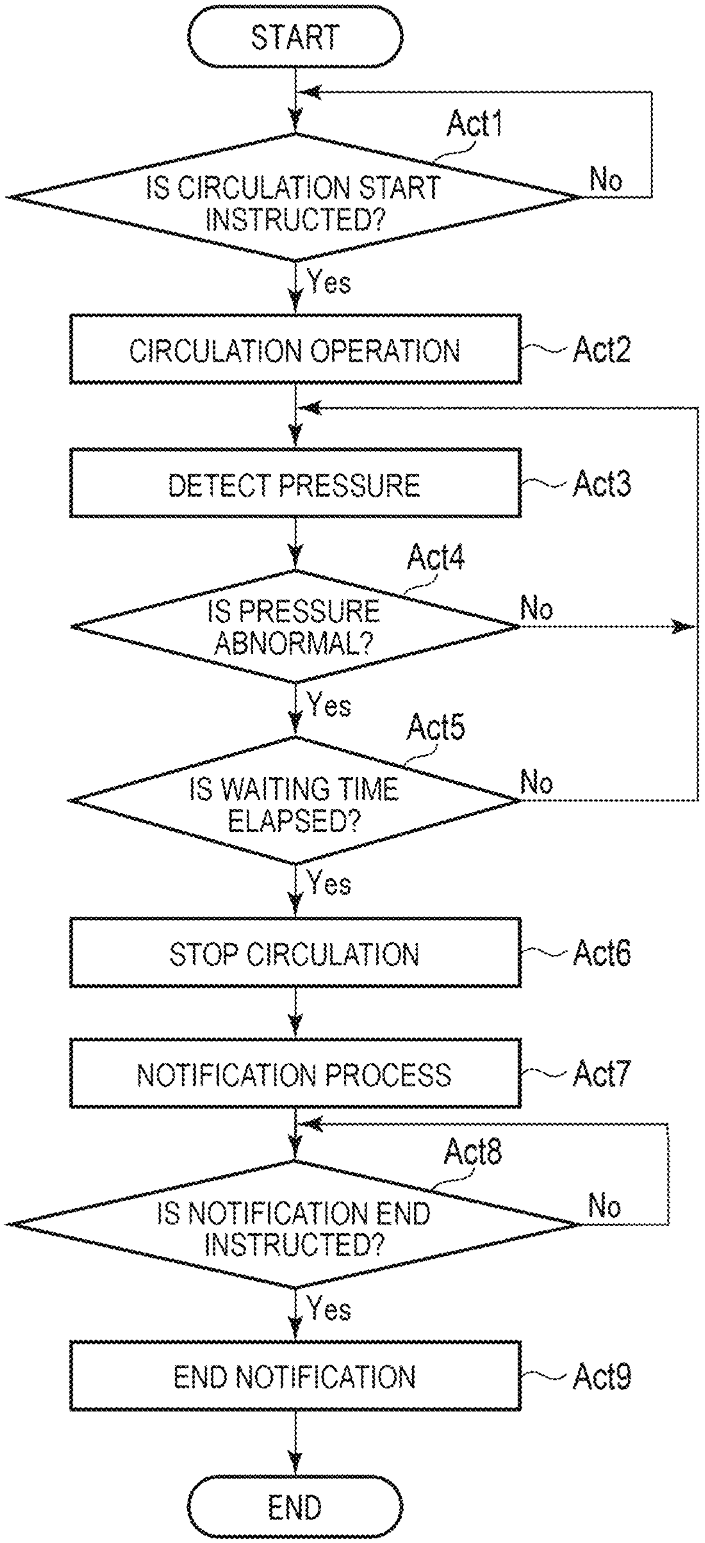
FIG. 3 is a flowchart illustrating aspects of a control method of an ink jet recording apparatus.
Figure 4:
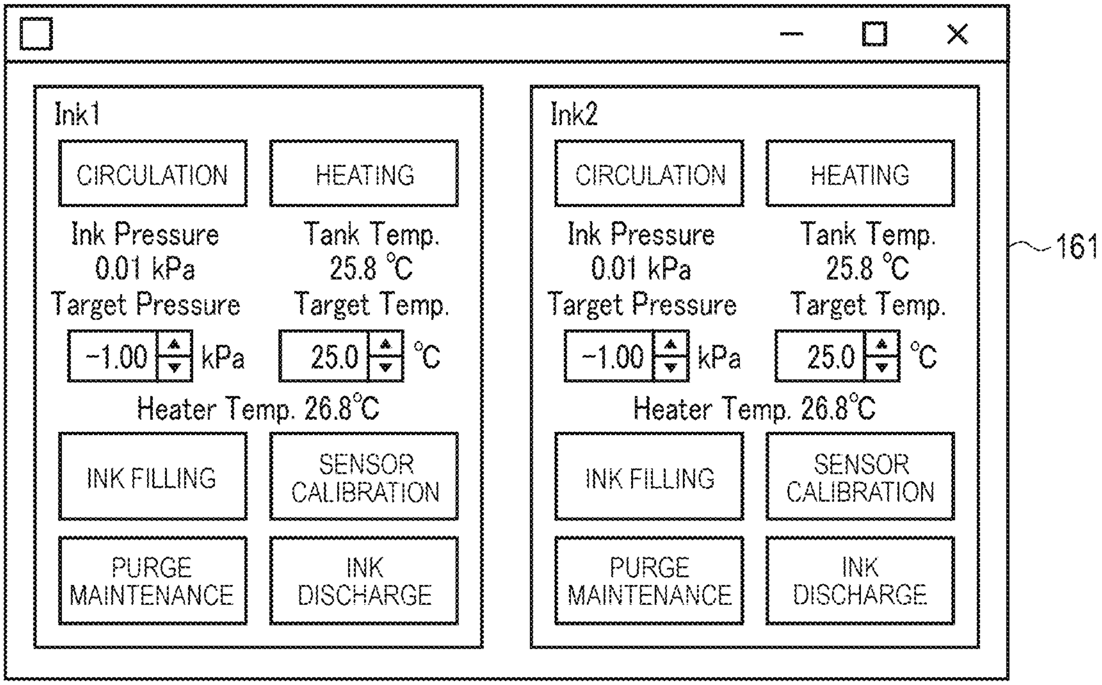
FIG. 4 depicts a part of a screen on a display device of an ink jet recording apparatus.
Figure 5:
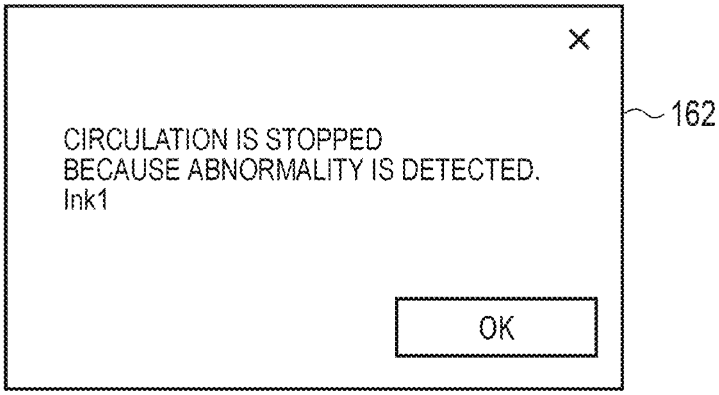
FIG. 5 depicts a part of a screen on a display device of an ink jet recording apparatus.

FIG. 1 is a diagram illustrating a configuration of the ink jet recording apparatus 1. FIG. 2 is a block diagram illustrating a configuration of a control unit of the ink jet recording apparatus 1. FIG. 3 is a flowchart illustrating a control method of the ink jet recording apparatus 1. FIGS. 4 and 5 are diagrams illustrating a display example of a display screen of a display device 16 of the ink jet recording apparatus 1.

The ink jet recording apparatus 1 illustrated in FIG. 1 includes the liquid ejecting device 10, a host control unit 13 (control device) connected to the liquid ejecting device 10, a power supply 14, an input device 15, the display device 16, and a buzzer 17. For example, the ink jet recording apparatus 1 includes a head support mechanism that movably supports the liquid ejecting device 10 or a medium support mechanism that movably supports a recording medium S.

The liquid ejecting device 10 includes a liquid ejecting head 20 and a circulating device 30 (also referred to as a liquid processing device). The liquid ejecting device 10 ejects an ink I (or other liquid) from the liquid ejecting head 20 to form a desired image on the recording medium S ("medium S"), such as paper.

For example, a single liquid ejecting device 10 or a plurality of liquid ejecting devices 10 can be provided. For example, a plurality of liquid ejecting devices 10, each having the same configuration, can be provided. The different liquid ejecting devices 10 can eject inks of different colors (for example, cyan ink, magenta ink, yellow ink, black ink, and white ink) onto a medium S to form a desired image. However, the colors or characteristics of the inks to be used are not particularly limited.

The liquid ejecting head 20 is an ink jet head including: a plurality of nozzles 21; and a manifold 22 providing a predetermined ink flow path including ink pressure chambers connected to nozzles 21. For the ink pressure chambers, an actuator that is connected to a drive circuit. The liquid ejecting head 20 ejects liquid from a particular nozzle 21 by the corresponding actuator being deformed according to a voltage supplied to the actuator as a drive signal or the like.

The circulating device 30 includes a circulation path 31 for circulating liquid. The circulating device 30 also includes a cartridge 32, a first pump 33, a first tank 34, a bypass tank 35, a second tank 36, a second pump 37, and a module control unit 38 (control device) that are provided in this order along the circulation path 31. The circulating device 30 can be configured such that the first pump 33, the first tank 34, the bypass tank 35, the second tank 36, the second pump 37, and the module control unit 38 are accommodated in a case 301 and the cartridge 32 is connected to a circulation head 300 as part of the circulation flow path.

The circulation path 31 is a flow path communicating with the liquid ejecting head 20. The circulation path 31 comprises, for example, a pipe formed of a metal or a resin material and a tube that covers an outer surface of the pipe, and forms a predetermined flow path therein. The circulation path 31 includes: a first flow path 311 on the upstream side that passes through the upstream first tank 34 from the cartridge 32 and reaches a supply port 201 of the liquid ejecting head 20; a second flow path 312 on the downstream side that passes through the second tank 36 from a collection port 202 of the liquid ejecting head 20 and reaches the cartridge 32; and a bypass flow path 313 that connects the first flow path 311 and the second flow path 312.

The bypass flow path 313 connects the first flow path 311 and the second flow path 312. The bypass flow path 313 provides a bypass route outside the liquid ejecting head 20 and connects a primary side of the liquid ejecting head 20 and a secondary side of the liquid ejecting head 20 on the circulation path 31. The bypass tank 35 is connected to the bypass flow path 313. That is, the bypass flow path 313 includes: a first bypass flow path 3131 that connects the bypass tank 35 and the first flow path 311; and a second bypass flow path 3132 that connects the bypass tank 35 and the second flow path 312.

The cartridge 32 contains the ink I. An air chamber in the cartridge 32 is exposed to the atmosphere. The cartridge 32 is connected to the first tank 34 through the first flow path 311 where the first pump 33 is provided.

The first pump 33 is provided in the first flow path 311 that is a flow path between the cartridge 32 and the first tank 34, and supplies the ink I in the cartridge 32 to the first tank 34.

The first tank 34 is connected to the primary side of the liquid ejecting head 20 through the circulation path 31. For example, in the first tank 34, a liquid level sensor 54 that detects a liquid level position in the first tank 34 is provided. The liquid level sensor 54 detects the amount of the ink in the first tank 34, and transmits the detected data to the module control unit 38.

The bypass tank 35 is provided in the bypass flow path 313. The bypass tank 35 has a flow path cross-sectional area that is larger than a flow path cross-sectional area of the bypass flow path 313. The bypass tank 35 includes, for example, an upper wall, a lower wall, a rear wall, a front wall, and a pair of right and left side walls and is configured in a rectangular box shape by which a storage chamber is formed. The bypass flow path 313 is connected to each of the pair of side walls of the bypass tank 35.

In a lower region of the storage chamber of the bypass tank 35, the ink flowing through the bypass flow path 313 is present. In an upper region of the storage chamber, an air chamber is formed. That is, the bypass tank 35 can store different amounts of liquid and air. In the present embodiment, a connection position of the first bypass flow path 3131 on the inflow side to the bypass tank 35 and a connection position of the second bypass flow path 3132 on the outflow side to the bypass tank 35 are set at the same height.

An opening and closing valve 41 ("valve 41") configured to be exposed to the atmosphere is connected to the air chamber of the bypass tank 35. That is, a connecting pipe 355 that extends upward is provided in the upper wall of the bypass tank 35, and the valve 41 that opens and closes a flow path in the connecting pipe 355 is provided in another end portion of the connecting pipe 355.

In the present embodiment, the bypass tank 35 is provided at a middle point on the bypass flow path 313, and the first bypass flow path 3131 and the second bypass flow path 3132 have the same pipe length and the same pipe diameter as one another. In the circulation path 31, the distance from a branch point of the first flow path 311 where the bypass flow path 313 is branched to the supply port 201 is the same as the distance from the collection port 202 to a junction point of the second flow path 312 to the second bypass flow path 3132.

Regarding the pressure in the circulation path 31, due to pressure loss caused by the flow resistance of the liquid ejecting head 20, the pressure on the primary side (that is, the inflow side) of the liquid ejecting head 20 is higher than that on the secondary side (that is, the outflow side) of the liquid ejecting head 20. On the circulation path 31 and the bypass flow path 313, the liquid flows from the primary side where the pressure is higher to the secondary side where the pressure is lower.

The second tank 36 is connected to the secondary side of the liquid ejecting head 20 through the circulation path 31. For example, in the second tank 36, a liquid level sensor 55 that detects a liquid level position in the second tank 36 is provided. The liquid level sensor 55 detects the amount of the ink in the second tank 36, and transmits the detected data to the module control unit 38.

The second pump 37 is a collection pump that is provided on the second flow path 312 and moves the liquid to the cartridge 32 side. The second pump 37 supplies the liquid from the second tank 36 to the cartridge 32.

The second pump 37 and the first pump 33 can each be a piezoelectric pump, in an example. In other examples, the second pump 37 and the first pump 33 can be a tube pump, a diaphragm pump, or a piston pump. The first pump 33 and the second pump 37 function as pressure adjustment mechanisms that adjust the pressure on the circulation path 31 and thus adjust the ink pressure at the nozzle 21.

A pressure sensor 39 is a pressure detection unit (pressure detector) that detects the pressure on the circulation path 31. For example, the pressure sensor 39 can be provided at any position along the circulation path 31 and detects the pressure in the circulation path 31 at a relevant point. The pressure sensor 39 in the present embodiment is provided in the bypass tank 35 and detects the pressure in the air chamber of the bypass tank 35. In other examples, the pressure sensor 39 (or an additional pressure sensor 39) may detect the pressure in another portion of the circulation path 31. For example, the pressure sensor 39 may detect the pressure in each of the sub-units of the circulation path 31, for example, each or any of the various tanks, the various flow path portions, and/or the cartridge 32 or in the liquid ejecting head 20. The pressure sensor 39 outputs the pressure as an electrical signal, for example, using a semiconductor piezoresistance pressure sensor. The semiconductor piezoresistance pressure sensor includes: a diaphragm that receives a pressure from the outside; and a semiconductor strain gauge that is formed on a surface of the diaphragm.

The semiconductor piezoresistance pressure sensor converts a change in electrical resistance occurring by a piezoresistance effect into an electrical signal to detect the pressure, and transmits the detected data to the module control unit 38.

The valve 41 is configured to open and close the air chamber of the bypass tank 35 to and from the atmosphere. The valve 41 can be opened to permit calibration of the pressure sensor 39 for the bypass tank 35.

The input device 15 (operating device) includes, for example, function keys such as a power key, a paper feed key, and an error release key. For example, the input device 15 includes a keyboard and a touch panel. The input device can be portions of, or attached to or integrated with, a computer terminal including the host control unit 13.

The display device 16 includes a display that displays various types of information related to operations of an image printing device. The display device 16 in this example is a display provided in the computer terminal including the host control unit 13.

The buzzer 17 generates a sound. The buzzer 17 is, for example, a piezoelectric buzzer that is mounted on a control substrate of the module control unit 38 and generates a sound when a voltage is applied.

In the circulating device 30, a filter that removes impurities in the ink I can be provided on the circulation path 31. A heater device 43 that adjusts the temperature of the ink I can also be provided on the circulation path 31.

The circulating device 30 may further include, as an adjustment mechanism, an opening and closing mechanism (e.g., a valve or the like) that opens and closes the air chamber in the first tank 34 and the second tank 36 to and from the atmosphere and/or an adjustment mechanism of an active type that pressurizes and/or depressurizes the first tank 34 and the second tank 36. The adjustment mechanism (s) can be controlled by the host control unit 13 or the module control unit 38 to expose the first tank 34 and the second tank 36 to the atmosphere or to pressurize and depressurize the second tank 36 such that the pressure of the circulation path 31 and the ink pressure at the nozzle 21 is adjusted.

Next, a control system of the ink jet recording apparatus 1 will be described. The control system of the ink jet recording apparatus 1 according to the present embodiment includes the host control unit 13 (host control device) and the module control unit 38 (module control device).

The host control unit 13 is connected to the power supply 14, the input device 15, and the display device 16. The host control unit 13 is provided in, for example, a computer terminal 130 (also referred to as "computer 130") including the display device 16 and/or the input device 15.

The host control unit 13 includes a CPU 131 (control unit), a drive circuit that drives each sub-unit, a storage unit 132 that stores various types of data, and a communication unit 133 (a communication interface).

The CPU 131 corresponds to a central part of the host control unit 13. The CPU 131 includes a processing circuit that controls sub-units to implement various functions according to various programs including an operating system and/or an application program. The CPU 131 detects information input to the input device 15 by an operator, user, administrator, or the like.

According to various operation conditions or various programs input via the input device 15 by a user or stored in advance in the storage unit 132, the CPU 131 transmits the operation conditions to the module control unit 38 to instruct the module control unit 38 about aspects of a control program or the operation conditions.

That is, by executing a control process based on the control program, the host control unit 13 functions as a printing unit, a moving unit, a display unit, an instruction unit, and a pressure adjustment unit that controls a printing operation, a moving operation, a display operation, an instruction operation, and a pressure adjustment operation, respectively.

The storage unit 132 includes a program memory or a RAM. The storage unit 132 stores an application program and/or various set values (parameters). The storage unit 132 stores, for example, a calculation formula for calculating the ink pressure of the nozzles 21 or various set values such as a target pressure value, a normal range, a pressure abnormal value, and an adjustment maximum value of each pump as control data used for pressure control.

One of the programs stored in the storage unit 132 can be a program causing the stopping of a circulation operation when the pressure value of the circulation path 31 is not inside a normal range. The circulation operation is an operation of causing the liquid to flow within the circulation path 31 or the like.

The communication unit 133 executes data communication with the module control unit 38 through a signal line such as an USB cable or through a wireless LAN. The communication unit 133 includes a communication interface for executing data communication. For example, the communication interface is a network interface.

The module control unit 38 includes a control substrate 70 (e.g., a circuit board) mounted on the circulating device 30, a CPU 71 (control unit), a drive circuit that drives each sub-unit, a storage unit 72 that stores various types of data, and a communication unit 73 for communication with the external host control unit 13. The storage unit 72 comprises a program memory and/or a RAM. The buzzer 17 is mounted on the control substrate 70.

The module control unit 38 receives various types of information such as operation conditions by communicating with the host control unit 13 through the communication unit 73.

An input operation of the user or an instruction from the host control unit 13 is transmitted to the CPU 71 of the module control unit 38 through the communication unit 73. Various types of information acquired by the module control unit 38 are transmitted to the host control unit 13 of the ink jet recording apparatus 1, or PC application running thereon, through the communication unit 73.

The CPU 71 corresponds to a central part of the module control unit 38. The CPU 71 includes a processing circuit that controls each of the sub-units to implement various functions according to an operating system and/or an application program.

Drive circuits 751, 752, 753, and 754 for the first pump 33, the second pump 37, the heater 43, and the valve 41 are provided on the control substrate 70 along with a drive circuit 755 for the liquid ejecting head 20 and a drive circuit 756 for the buzzer 17. Each of these drive circuits are connected to the CPU 71. The pressure sensor 39 is also connected to the CPU 71.

The CPU 71 provides a function as a circulation unit that circulates the ink by controlling the operations of the first pump 33 and the second pump 37 based on an instruction from the host control unit 13.

The CPU 71 provides a function as a replenishment unit that replenishes the circulation path 31 with the ink from the cartridge 32 by controlling the operations of the first pump 33 and the second pump 37 based on an instruction from the host control unit 13.

The CPU 71 provides a function as a pressure adjustment unit that adjusts the pressure of the ink at the nozzle 21 by controlling the pumps 33 and 37 based on information detected by the pressure sensor 39 and/or an instruction from the host control unit 13.

The storage unit 72 comprises a program memory and/or a RAM. The storage unit 72 stores various programs or various set values (parameters). The storage unit 72 stores, for example, a calculation formula for calculating the ink pressure at the nozzles 21 and/or various set values such as a target pressure value, a normal range, an abnormal pressure value, and an adjustment maximum value of each pump as control data used for pressure control.

The communication unit 73 executes data communication with the host control unit 13 through a signal line such as an USB cable or through a wireless LAN. The communication unit 73 includes a communication interface for executing data communication. For example, the communication interface is a network interface.

Hereinafter, the control process and the control program of the liquid ejecting device 10 according to an embodiment will be described with reference to a flowchart of FIG. 3. For example, the host control unit 13 or the module control unit 38 operates as the control device in this embodiment according to various programs stored in the storage unit 132. For example, the ink jet recording apparatus 1 executes a liquid ejecting process including an ink circulation operation in the circulating device 30, a liquid ejection operation in the liquid ejecting head 20, and a conveying operation for the medium.

One of the programs stored in the storage units 132 and 72 is, for example, a control program for executing a process of stopping the circulation operation in the circulating device 30 and a notification process when the pressure of the circulation path 31 is outside the normal range.

In the present embodiment, both the host control unit 13 and the module control unit 38 are provided, and the module control unit 38 is controlled based on a signal transmitted to the module control unit 38 within the circulating device 30 from the host control unit 13 outside the circulating device 30. However, the present embodiment is not limited thereto, and the circulating device 30 may be controlled by either one of the host control unit 13 and the module control unit 38.

Referring to FIG. 3, when an instruction to start circulation is detected in Act 1 (Yes in Act 1), the CPU 131 starts the circulation process (Act 2). In a specific example, a first display unit 161 (that is a part or portion of the display screen of the display device 16) displays a print start button, and the user selects a print start by operation of the input device 15. When the CPU 131 detects that the user inputs an instruction to start printing (Yes in Act 1), the CPU 131 begins the liquid ejecting process including the ink circulation operation in the circulating device 30, the liquid ejection operation in the liquid ejecting head 20, and the conveying operation of the medium. Specifically, the CPU 131 transmits an instruction to start the liquid ejecting process including the ink circulation operation, the liquid ejection operation, and the conveying operation to the module control unit 38.

When the instruction is received from the CPU 131, the CPU 71 drives the first pump 33 or the second pump 37 to start the ink circulation operation in the circulation path 31. The CPU 71 transmits an image signal corresponding to the image data (print data or data to be printed) to the drive circuit 755 of the liquid ejecting head 20, and selectively drives the actuators of the liquid ejecting head 20 to eject the ink droplets from nozzle(s) 21 on to the recording medium S. The CPU 71 executes the printing operation of executing the ink ejection operation while causing the liquid ejecting device 10 to reciprocate in a direction perpendicular to a conveying direction of the recording medium S such that the image can be formed (printed) on the recording medium S.

Here, the ink I of the first flow path 311 is distributed to the liquid ejecting head 20 and the bypass tank 35 through the bypass flow path 313 based on a pipeline resistance of the bypass flow path 313 and the bypass tank 35. That is, a part of the ink I reaches the liquid ejecting head 20 from the first tank 34 through the first flow path 311, reaches the second tank 36 through the second flow path 312, and flows to the first tank 34 again for circulation. The remaining part of ink I is transmitted from the first flow path 311 to the second flow path 312 through the bypass flow path 313 and the inside of the bypass tank 35 without passing through the liquid ejecting head 20, and flows to the first tank 34 again through the second tank 36. Due to the circulation operation, accumulated impurities in the ink I can be removed by the filter provided in the circulation path 31.

The CPU 131 drives the pumps 33 and 37 (or another pressure adjustment mechanism) such that an ink pressure Pn of the nozzle 21 is an appropriate value during the printing operation. As a result, the ink I does not leak from the nozzle 21 of the liquid ejecting head 20, a negative pressure is maintained to the extent that bubbles are not drawn in from the nozzle 21, and the meniscus is maintained in the proper manner.

The CPUs 131 and 71 may cooperate to adjust the liquid level during the circulation process. For example, the first pump 33 or the second pump 37 can be controlled based on the detection results of the liquid level sensors 54 and 55 to replenish the ink from the cartridge 32 and to adjust the liquid level position to be within an appropriate range. The CPUs 131 and 71 may cooperate to control the heater device 43 to adjust the temperature of the ink during the circulation process.

During the circulation, at a predetermined timing (e.g., regular intervals), the CPU 131 detects the ink pressure at the nozzle 21 based on the detection value from the pressure sensor 39 (Act 3). Specifically, the ink pressure at the nozzle 21 is calculated using a predetermined arithmetic expression (formula) based on the pressure data of the bypass tank 35 from the pressure sensor 39.

The pressure detected in the bypass tank 35 is an average value of a pressure value Ph of the ink on the first flow path 311 and a pressure value PI of the ink on the second flow path 312. Therefore, by adding a pressure ρgh generated by a water (hydraulic) head difference between the height of a pressure measurement point and a nozzle surface height to the pressure value of the bypass tank 35, the ink pressure Pn of the nozzle 21 can be obtained. Here, ρ represents density of the ink, g represents gravitational acceleration, and h represents the distance (height difference) between the pressure measurement point and the nozzle surface in the height direction.

For example, the CPU 131 executes the control program to determine whether the calculated ink pressure Pn for the nozzle 21 is abnormal. For example, the CPU 131 determines whether the pressure value at the nozzle 21 calculated from the pressure value is in a predetermined or preset normal range (Act 4). When the pressure value is an abnormal value outside the preset normal range (Yes in Act 4), the CPU 131 controls the pumps 33 and 37, the valve 41, and the like to stop the circulation operation (Act 6) and executes the notification process (Act 7).

In Act 5, the CPU 131 waits for a predetermined period of time to elapse after an abnormal pressure detection and then executes the stop control (ACT 6) and the notification process (ACT 7) if the abnormal pressure is still detected. That is, for example, after the circulation starts or when a target pressure is changed, the CPU 131 waits until the predetermined period of time elapses before acting on the abnormal pressure detection result. Alternatively, when the target pressure value is changed, the CPU 131 waits until the pressure reaches a value close to the target pressure value, for example, the target ±0.01 kPa. Unless the pressure is stabilized after the predetermined period of time elapses, the CPU 131 executes the stop control of Act 6 and the control of the notification process of Act 7. That is, for a predetermined period of time after starting the circulation or for a predetermined period of time after changing the target pressure, the CPU 131 does not execute the stop control or the notification process.

The pressure abnormal value can be determined based on or relative to the target pressure value. FIG. 4 is an example of the screen on the display device 16. As illustrated in FIG. 4, the first display unit 161 includes a setting screen of the display device 16 and thus displays various conditions for one or more liquid ejecting devices 10, along with buttons for operation, device or operation status indicators, and the like. For example, the first display unit 161 displays various types of information such as a measured value of the pressure sensor 39 or the pressure at the nozzle 21 as calculated from the measured value on the same screen with the target pressure. For example, while seeing the first display unit 161, the user inputs instructions of various operations and sets the target pressure or various conditions by operating the input device 15. The CPU 131 executes various controls corresponding to the user inputs (selections). For example, a range for the target pressure can be set. For example, the CPU 131 determines the normal range of pressure control based on a range that is preset based on the input/set target value, and identifies a pressure outside the normal range as an error indicator target or as an abnormal pressure value. For example, the CPU 131 sets the range within which the difference from the target value is considered to within a predetermined tolerance value as a normal range, and sets pressure values outside this normal range to be an abnormal pressure value in the pressure control.

In a specific example, for example, when the target pressure is set to −1.00 kPa and a range of plus or minus 0.1 kPa is set (as illustrated in FIG. 4), the range of −1.1 kPa to −0.9 kPa is the normal range, and a value less than −1.1 kPa or greater than −0.9 kPa will be considered an pressure abnormal value.

When a malfunction in the pressure control occurs, for example, due to incomplete ink filling when the ink circulation starts, when the cartridge is empty, when the target pressure is set to an excessive negative pressure such that air flows into the nozzle 21, when the ink is clogged in the circulation path 31, or when the ink unintentionally leaks from the circulation path 31, the measured/calculated pressure value will generally be an abnormal value. Accordingly, when the pressure value becomes an abnormal value during the ink circulation, the CPU 131 determines that a malfunction occurred, automatically stops the ink circulation, and executes the notification process.

That is, when the pressure value of the nozzle calculated from the measurement value is outside the normal range and is thus an abnormal value (Yes in Act 4), the CPU 131 will eventually stop the circulation operation (Act 6) and set the device to the waiting state.

In the circulation stop process of Act 6, the CPU 131 outputs an instruction to the module control unit 38 to stop the first pump 33 and the second pump 37 and to turn off (close) the valve 41. When the circulation stop instruction is received from the host control unit 13, the CPU 71 of the module control unit 38 stops the circulation process. For example, the circulation stop control enters an infinite loop until an instruction that cancels the circulation instruction is received. In other words, the CPU 71 stops the circulation until an instruction to cancel the previous circulation instruction (cancellation) is received from the host control unit 13.

The CPU 131 executes the notification process during the circulation stop (Act 7). For example, the CPU 131 outputs an instruction to execute the notification process to the module control unit 38.

When the instruction of the notification process is received, the CPU 71 applies a voltage to the buzzer 17 to generate a buzzer sound and causes the display device 16 to display a message such that the user is visually and auditorily notified and urged to perform a remedial measure or maintenance.

In an example of the notification process by the CPU 71, a buzzer tasking continuously revolves with a period of 500 μs or 100 ms without sleeping, and once an instruction to turn on the buzzer is received from the host control unit 13, the CPU 71 reverses the buzzer port output to output a buzzer sound after waiting for 500 μs. Here, the CPU 71 sets, for example, a frequency such that the tone is noticeable without being too unpleasant. On the other hand, when an instruction to turn on the buzzer is not received from the host control unit 13, the CPU 71 waits for the instruction with a period of 100 ms.

As a display process of the notification process, the CPU 71 causes a second display unit 162 that is a part of the display screen to display a message box including a message to the user, for example, as illustrated in FIG. 5. For example, the CPU 71 also causes the message box to display the identification of the liquid ejecting device 10 where the abnormality occurred as in "Ink 1" of FIG. 5. For example, the CPU 71 causes the message box to display a message "Circulation is stopped because abnormality is detected" and an "OK" button (confirmation button).

The CPU 71 continues the notification process until an instruction to end the notification process is detected (Act 8). For example, the user inputs the notification end instruction by clicking the "OK" button of the message box of the second display unit 162 through the operation of the input device 15. When the instruction to end the notification process is detected, the CPU 131 outputs the instruction to end the notification to the module control unit 38 (Act 9). When the instruction to end the notification process is received, the CPU 71 ends the notification process by stopping the buzzer 17 and ending the display of the message box.

The CPU 131 can repeat or loop the steps from Act 2 to Act 9 until a circulation end instruction is detected. When the instruction to end the circulation is detected, the CPU 131 outputs the instruction to end the process to the module control unit 38 and then the module control unit 38 ends the circulation operation in response to the instruction from the host control unit 13.

The liquid ejecting device 10 according to the present embodiment can ensure safety and improve printing efficiency. Whenever a malfunction of pressure control occurs in an ink circulating device, appropriate ejection printing of the connected liquid ejecting head cannot be executed, and an image defect occurs. When the pressure value is in a predetermined error range, the message box and the buzzer sound attracts the user's attention visually and auditorily. Accordingly, by urging the user for maintenance, safety and proper functioning can be ensured.

The function of displaying the message box and generating the buzzer sound that notify the user that the pressure control is abnormal and to urge the user to take remedial measures such as maintenance is provided. When a malfunction occurs in the pressure control but printing continues, the material and the time spent for printing are wasted. This is especially a concern with large print jobs or the like. However, with the present embodiment, the malfunction of the pressure control can be identified and notified at an early stage, and the printing efficiency can be improved by stopping the continuation of printing that might be erroneous or abnormal.

In the liquid ejecting device 10 according to the first embodiment, by making the determination for the pressure abnormality after a predetermined period of time elapses, false detection of an error when the pressure is temporarily unstable can be avoided, and the user can frequently change the target pressure as desired. For example, when a predetermined period of time elapses after starting the circulation or when the target pressure is changed, by setting the normal range to be the target pressure ±0.01 kPa along with a predetermined warning delay time (for example, 10 seconds), erroneous detection of an abnormal pressure that might otherwise occur in normal operations can be prevented.

In the first embodiment, a sound is generated by the buzzer 17, which is in the circulating device 30, and information is displayed by the display device 16 to provide multiple notification types. Other notification types or processes may be adopted, such that even when the user is at a location distant (remote) from the circulating device 30, the abnormality can be notified to the user.

Figure 6:
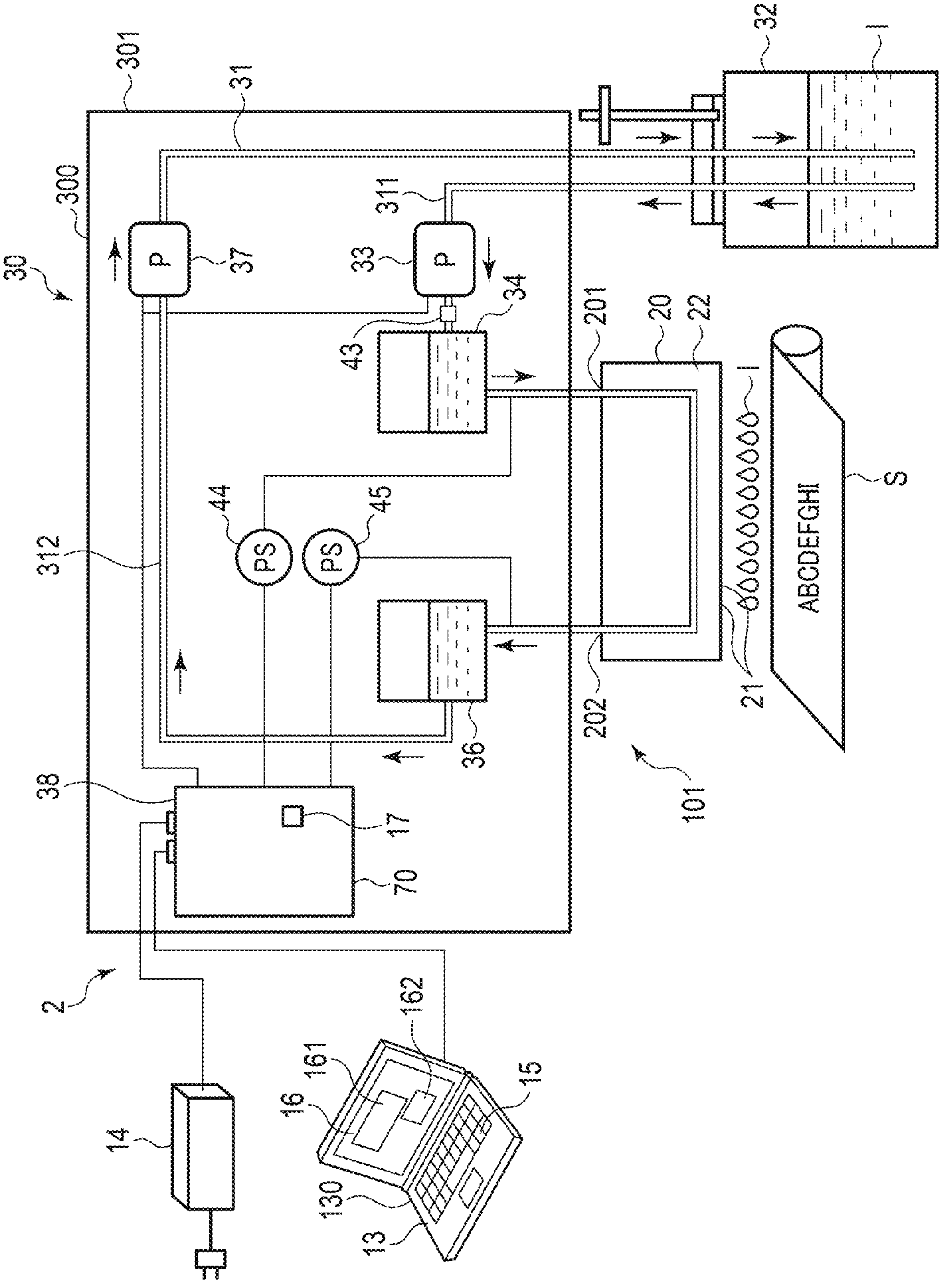
FIG. 6 depicts an ink jet recording apparatus according to another embodiment.

The configurations of the liquid ejecting device 10 and the liquid circulating device 30 according to the above-described embodiment are not particularly limited. In an example, a configuration where the first tank 34 and the second tank 36 are provided in the first flow path 311 and the second flow path 312 is described. However, the embodiments are not limited thereto. For example, in an ink jet recording apparatus 2 according to a second embodiment, as illustrated in FIG. 6, a liquid ejecting device 101 may be configured without the bypass flow path 313 and the bypass tank 35. In the liquid ejecting device 101, a pressure sensor 44 is provided in the first flow path 311, a pressure sensor 45 is provided in the second flow path 312, and the CPU 131 calculates the pressure at the nozzle 21 from the detection values of the pressure sensors 44 and 45. For example, the average value of the pressure value of the first flow path 311 detected by the pressure sensor 44 and the pressure value of the second flow path 312 detected by the pressure sensor 45 is calculated as the pressure at the nozzle 21. Even in such liquid ejecting device 101, substantially the same effects as described for that of the liquid ejecting device 10 according to the first embodiment can be obtained.

In the first embodiment and the second embodiment described above, the abnormality determination is made based on the pressure value. However, the process of the abnormality determination is not limited to these embodiments. For example, in addition to an abnormality determination based on the pressure value, additional control of determining an error factor may be further executed. For example, as error factor determination, the CPU 131 identifies an error factor based on various detected or measured conditions or operating parameters such as one or more of pressure, frequency, pulse width, output value, the number of outputs, and temperature.

For example, when an error occurs in Act 4, the CPU 131 determines a malfunction factor based on the output of the first pump 33 as a push pump or the second pump 37 as a pull pump. For example, based on a minimum value of the pulse width of the first pump 33 within a certain period of time, a malfunction occurring due to adjustment disability caused when the liquid ejecting head 20 runs out of ink such that nozzle pulling starts or adjustment disability caused by ink clogging on the downstream side can be identified as a first (primary) error factor. For example, when the pulse width of the first pump 33 reaches the minimum value (for example, 200) five times or more within 100 ms, the CPU 131 determines that the first error factor occurred. Here, the first error factor is not likely to occur in normal operation, and when a heater for heating the ink is provided, the circulation stop process is immediately executed to prevent empty heating.

For example, the CPU 131 determines a malfunction caused by upstream ink clogging, a malfunction caused when the ink is consumed such that the ink reservoir is empty, as a second error factor based on the output of the pulse width of the second pump 37 within a certain period of time. For example, when the pulse width of the pull pump (second pump 37) is less than 400 times or more than 800 within 1000 ms, the CPU 131 determines that the second error factor occurred. Here, regarding the pulse width, the upstream ink clogging is assumed as the second error factor. Here, the threshold is determined considering that, when the upstream ink clogging occurs, the pressure in the second pump 37 will be adjusted for the nozzle surface pressure to a small pulse width.

Here, the phenomenon is similar to that occurring when a large liquid droplet ejecting head is used. Therefore, to not erroneously determine that large droplets are being ejected, a control of stopping the circulation process after waiting until a predetermined period of time (for example, 1000 ms) elapses is executed. In the second embodiment, by determining the error factor based on the outputs of the pumps 33 and 37, the factor can be more particularly identified, and the user can be urged to take a more appropriate measure. In addition to the first error factor and the second error factor described above, another factor such as a factor occurring when the target pressure is set to an excessive negative pressure such that air flows into the nozzle 21, when the ink is clogged at any portion of the circulation path 31, or when the ink leaks at any portion of the circulation path 31 may be identified.

In an example, display device 16 is provided in the terminal of the host control unit 13 and displays the second display unit 162 including the message, and the buzzer 17 of the module control unit 38 generates a sound. However, the disclosure is not limited thereto. For example, the notification process may be executed through another external terminal that is wired or wirelessly connected. The ink jet head is not limited to a circulation type. In some examples, a non-circulation type ink jet head can be adopted, when the pressure of the flow path is outside the normal range in such a type, the operation of causing the liquid to flow may be stopped or the abnormality may be notified. In an non-circulation type inkjet head, the liquid flows to the liquid ejecting head from a tank to the liquid ejecting head, and the pressure on the flow path can be detected by a pressure sensor provided in the flow path.

The liquid ejected by the liquid ejecting device 10 is not limited to ink, and liquid other than ink can be ejected. As a liquid ejecting device that ejects liquid other than the ink, a device that ejects liquid including conductive particles for forming a wiring pattern on a printed wiring board or the like may also be used.

As the second pump 37 and the first pump 33, a tube pump, a diaphragm pump, or a piston pump may be used instead of a piezoelectric pump.

A configuration where only one liquid ejecting device 10 is provided may be adopted.

The liquid ejecting head 20 in some examples may have a structure in which ink droplets are ejected from the nozzle 21 by deforming a diaphragm with static electricity or using thermal energy supplied by a heater or the like.

The configuration of the control system can also be appropriately changed. In an example, an instruction is output from the host control unit 13 to the module control unit 38, and is executed by the module control unit 38. However, the disclosure is not limited thereto. In some examples, instead of outputting an instruction from the host control unit 13 to the module control unit 38, a signal may be output from the module control unit 38 to the host control unit 13, and the host control unit 13 may control the circulating device 30 based on the instruction from the module control unit 38.

The notification process may also include not only the display of a message or the generation of a warning sound but also the output of an instruction to execute the process in the circulating device 30 or otherwise.

A control program that is executed by the host control unit 13 or the module control unit 38 may be provided as installable or executable files recorded in a non-transitory, computer-readable recording media. The control program that is executed by the host control unit 13 or the module control unit 38 may be stored in a computer connected to a network, such as the Internet, and accessed, downloaded, distributed, or otherwise provided through the network. The control program may be provided by incorporating the program into a ROM or the like in advance. For example, the control method is executed as an application program of the host control unit 13, and an instruction is transmitted to the module control unit 38. However, embodiments are not limited thereto. For example, a dedicated control circuit for the circulation control or the pump operation stop control may be mounted on the module control unit 38, and the above-described control process may be executed in the module control unit 38.

In each of the above-described embodiments, a CPU is provided as the control unit or the control device, and the CPU implements the functions of each unit by executing a predetermined program. However, the disclosure is not limited thereto. For example, processes can also be executed using a large scale integration (LSI) device, an application specific integrated circuit (ASIC), a field-programmable gate array (FPGA), a graphics processing unit (GPU), or other hardware, or can also be executed by cooperation between combinations of software and hardware.

In some embodiments, the liquid ejecting device can be a 3D printer, an industrial manufacturing machine, or medical use device, and the size and cost thereof can be reduced thereby.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid processing device, comprising:
a liquid flow path connected to a liquid ejecting head; and
a control unit configured to:
begin an operation to cause liquid to flow in the liquid flow path to the liquid ejecting head,
receive a pressure value for liquid in the liquid flow path, and
stop the operation when the pressure value is outside a normal range, wherein
the stopping of the operation when the pressure value is outside the normal range occurs after a predetermined period of time elapses after the receiving of the pressure value that is outside the normal range.

2. The liquid processing device according to claim 1, wherein the normal range depends on a target pressure value for liquid in the liquid flow path.

3. The liquid processing device according to claim 1, wherein the control unit is further configured to:
cause a notification to be output when the pressure value is outside the normal range.

4. The liquid processing device according to claim 3, wherein the notification is an audible sound.

5. The liquid processing device according to claim 3, wherein the notification is a visual display on a display screen.

6. The liquid processing device according to claim 3, wherein the notification includes a visual display on a display screen and an audible sound.

7. A control device for a liquid processing device, the control device comprising:
a processor configured to:
begin an operation to cause liquid to flow in a liquid flow path to a liquid ejecting head,
receive a pressure value for liquid in the liquid flow path, and
stop the operation when the pressure value is outside a normal range, wherein
the stopping of the operation when the pressure value is outside the normal range occurs after a predetermined period of time elapses after the receiving of the pressure value that is outside the normal range.

8. The control device according to claim 7, wherein the normal range depends on a target pressure value for liquid in the liquid flow path.

9. The control device according to claim 7, wherein the processor is further configured to:
cause a notification to be output when the pressure value is outside the normal range.

10. The control device according to claim 9, wherein the notification is an audible sound.

11. The control device according to claim 9, wherein the notification is a visual display on a display screen.

12. The control device according to claim 9, wherein the notification includes a visual display on a display screen and an audible sound.

13. A method for a control device of a liquid processing device, the method comprising:
beginning an operation to cause liquid to flow in a liquid flow path to a liquid ejecting head;

receiving a pressure value for liquid in the liquid flow path; and stopping the operation when the pressure value is outside a normal range, wherein the stopping of the operation when the pressure value is outside the normal range occurs after a predetermined period of time elapses after the receiving of the pressure value that is outside the normal range.

14. The method according to claim 13, further comprising:

causing a notification to be output when the pressure value is outside the normal range.

15. The method according to claim 14, wherein the notification includes a visual display on a display screen and an audible sound.

16. The method according to claim 13, wherein the normal range depends on a target pressure value for the liquid in the liquid flow path.

* * * * *